US012312211B2

(12) United States Patent
Valdivia Guerrero et al.

(10) Patent No.: US 12,312,211 B2
(45) Date of Patent: May 27, 2025

(54) POWER MANAGEMENT IN AN ELEVATOR SYSTEM

(71) Applicant: Otis Elevator Company, Farmington, CT (US)

(72) Inventors: Virgilio Valdivia Guerrero, Roquetas de Mar (ES); Ismail Agirman, Southington, CT (US); Daniel Diaz-Lopez, Tres Cantos (ES); Mario Sanz Abia, Valladolid (ES); Stephan Glessner, Berlin (DE); Herbert Horbrugger, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1571 days.

(21) Appl. No.: 16/654,718

(22) Filed: Oct. 16, 2019

(65) Prior Publication Data
US 2020/0122960 A1 Apr. 23, 2020

(30) Foreign Application Priority Data
Oct. 19, 2018 (EP) .................................. 18201462

(51) Int. Cl.
B66B 1/30 (2006.01)
H02P 3/14 (2006.01)
H02P 27/06 (2006.01)

(52) U.S. Cl.
CPC ............. B66B 1/306 (2013.01); B66B 1/302 (2013.01); H02P 3/14 (2013.01); H02P 27/06 (2013.01)

(58) Field of Classification Search
CPC .. B66B 1/30; B66B 1/308; B66B 1/32; B66B 1/00; B66B 2201/00; B66B 5/16
See application file for complete search history.

(56) References Cited

U.S. PATENT DOCUMENTS 7,246,686 B2   7/2007  Smith et al.
7,554,278 B2   6/2009  Wegner-Donnelly et al.
(Continued)

FOREIGN PATENT DOCUMENTS

CN   102123927 A  *  7/2011  ............. B66B 1/302
CN   102225730 A     10/2011
(Continued)

OTHER PUBLICATIONS

European Search Report for application EP 18201462.1, dated Jun. 3, 2019, U321407EP, 9 pages.
(Continued)

Primary Examiner — Jeffrey Donels
(74) Attorney, Agent, or Firm — CANTOR COLBURN LLP

(57) ABSTRACT

A power management system for an elevator system. A power management system for an elevator system includes a power converter having three input terminals, two of the three input terminals coupled to a main power source for supplying single-phase AC power to the power management system, the power converter configured to convert the AC power from the main power source into DC power on a common DC bus, a secondary power source for supplying DC power to the common DC bus, a power inverter configured to invert the DC power on the common DC bus into AC output power for driving an electric motor of the elevator system, and a dynamic braking resistor which is coupled between a third input terminal among the three input terminals of the three-phase power converter and the common DC bus.

13 Claims, 3 Drawing Sheets

(56) References Cited

U.S. PATENT DOCUMENTS

| | | | |
|---|---|---|---|
| 7,681,694 B2 | 3/2010 | Aulanko et al. | |
| 8,172,042 B2 | 5/2012 | Wesson et al. | |
| 8,629,637 B2 | 1/2014 | Blasko et al. | |
| 8,664,897 B2 | 3/2014 | Iwashita et al. | |
| 9,054,620 B2 | 6/2015 | Niwa et al. | |
| 9,092,027 B2 | 7/2015 | Okita et al. | |
| 9,118,270 B2 | 8/2015 | Niwa | |
| 9,377,774 B2 | 6/2016 | Tajima | |
| 9,401,669 B2 | 7/2016 | Tsutsumi | |
| 9,602,039 B2 | 3/2017 | Niwa et al. | |
| 9,667,177 B1 | 5/2017 | Li et al. | |
| 10,008,917 B2 | 6/2018 | Agirman et al. | |
| 11,046,553 B2 | 6/2021 | Cheng et al. | |
| 11,155,439 B2 | 10/2021 | Ratia et al. | |
| 2009/0014252 A1 | 1/2009 | Vedula | |
| 2011/0247900 A1* | 10/2011 | Blasko | H02P 27/00 187/247 |
| 2018/0334359 A1* | 11/2018 | Nikander | B66B 1/3492 |
| 2020/0122960 A1* | 4/2020 | Valdivia Guerrero | H02M 3/158 |
| 2020/0122961 A1* | 4/2020 | Valdivia Guerrero | B66B 1/306 |

FOREIGN PATENT DOCUMENTS

| | | | | |
|---|---|---|---|---|
| CN | 101817471 B | * | 6/2012 | |
| CN | 203922415 U | | 11/2014 | |
| CN | 107070209 A | | 8/2017 | |
| CN | 110436283 A | | 11/2019 | |
| CN | 107591870 B | | 11/2020 | |
| EP | 2768131 A1 | | 8/2014 | |
| EP | 3483106 A1 | | 5/2019 | |
| EP | 3640176 A1 | * | 4/2020 | B66B 1/30 |
| EP | 3640177 A1 | * | 4/2020 | B66B 1/306 |
| JP | H07165372 A | | 6/1995 | |
| JP | H09233898 A | * | 9/1997 | |
| KR | 102346456 B1 | * | 1/2022 | |
| WO | WO-2010019124 A1 | * | 2/2010 | B66B 1/302 |
| WO | WO-2010019126 A1 | * | 2/2010 | B66B 1/302 |
| WO | WO-2010042118 A1 | * | 4/2010 | B66B 1/302 |
| WO | WO-2010059141 A1 | * | 5/2010 | B66B 1/302 |

OTHER PUBLICATIONS

Hung, Thanh et al., "Power balancing in a DC microgrid elevator system through constrained optimization", Romanian National Authority for Scientic Research and Innovation, 2016, 27 pages.

* cited by examiner

POWER MANAGEMENT IN AN ELEVATOR SYSTEM

FOREIGN PRIORITY

This application claims priority to European Patent Application No. 18201462.1, filed Oct. 19, 2018, and all the benefits accruing therefrom under 35 U.S.C. § 119, the contents of which in its entirety are herein incorporated by reference.

BACKGROUND

The invention relates to an elevator system, in particular, to a power management system to be used in an elevator system.

In an elevator system an elevator car makes vertical movements to transport passengers between different floors in a building. An electric motor controlled by a power management system is used to drive the elevator car. Stable supply of electric power to the electric motor is very important. Existing power management systems normally use three-phase AC power as a main source supplying power to the elevator systems. There has been a growing interest in developing power management systems capable of employing various types of power sources and supplying stable electric power to elevator systems.

It would be beneficial to provide an enhanced power management system to be used in an elevator system, in particular it would be beneficial to enable integration or addition of different types of power sources to an existing power management system while avoiding causing additional cost and complexity.

BRIEF DESCRIPTION

Exemplary embodiments of the invention include a power management system for an elevator system, comprising a three-phase power converter having three input terminals and two output terminals, a first and a second of the three input terminals coupled to a main power source for supplying single-phase AC power to the power management system, the power converter configured to convert the AC power from the main power source into DC power on a common DC bus connected to the two output terminals, a secondary power source for supplying DC power to the common DC bus, a power inverter configured to invert the DC power on the common DC bus into AC output power for driving an electric motor of the elevator system, and a dynamic braking resistor which is coupled between a third input terminal among the three input terminals of the power converter and the DC bus.

Exemplary embodiments of the invention include a power management system for an elevator system, comprising a three-phase power converter having three input terminals and two output terminals, a first and a second of the three input terminals coupled to a main power source for supplying single-phase AC power to the power management system, the power converter configured to convert the AC power from the main power source into DC power on a common DC bus connected to the two output terminals, a secondary power source for supplying DC power to the common DC bus, a power inverter configured to invert the DC power on the common DC bus into AC output power for driving an electric motor of the elevator system, and a supercapacitor stack coupled between a third input terminal among the three input terminals of the power converter and the common DC bus.

In exemplary embodiments of the invention, the single-phase AC power is provided with the power converter via the first and the second input terminals among the three input terminals of the power converter. Either the dynamic braking resistor or the supercapacitor stack is coupled between the remaining third input terminal among the three input terminals of the power converter and the common DC bus. With these configurations, the single-phase AC power can be employed in an existing power management system comprising a three-phase power converter normally configured for connection to a three-phase power supply with minimum number of conversion stages. In addition, the dynamic braking resistor or the supercapacitor stack can be coupled to the power management system using power switches included in the existing three-phase power converter without causing additional cost and complexity. Further, a secondary power source like a DC battery and/or an alternative power source including at least one of a solar panel, a fuel cell or a wind turbine can be easily integrated into the existing power management system by coupling them to the DC bus. A DC/DC converter or an AC/DC converter may be used to couple the secondary power source to the DC bus.

Exemplary embodiments of the invention include a power management system for an elevator system, comprising a three-phase power converter having three input terminals and two output terminals, a first of the input terminals coupled to a main power source for supplying single-phase AC power to the power management system, the power converter configured to convert the AC power from the main power source into DC power on a common DC bus connected to the two output terminals, a secondary power source for supplying DC power to the common DC bus, a power inverter configured to invert the DC power on the common DC bus into AC output power for driving an electric motor of the elevator system, a dynamic braking resistor which is coupled between a second input terminal among the three input terminals of the power converter and the common DC bus, and a supercapacitor stack which is coupled between a third input terminal among the three input terminals of the power converter and the common DC bus.

With this configuration, the main power source supplying the single-phase AC power to the power management system is coupled between the first input terminal among the three input terminals of the power converter and an intermediate circuit connected in between positive and negative poles of the common DC bus, and the two remaining input terminals of the power converter are coupled to the dynamic braking resistor and the supercapacitor stack, respectively. This configuration allows using two of the input terminals (phase-legs) of the power converter to further reduce the amount of extra power conversion stages. In addition, the dynamic braking resistor and the supercapacitor stack can be incorporated into an existing power management system of an elevator system comprising a three-phase power converter normally connected to a three-phase power grid using power switches included in the three-phase power converter without incurring additional cost and complexity. Further, a secondary power source like a DC battery and/or an alternative power source including at least one of a solar panel or a wind turbine can easily be integrated into the existing power management system by coupling them to the common DC bus. A DC/DC converter or an AC/DC converter may be used to couple the secondary power source to the common DC bus.

According to a further embodiment, the secondary power source may be a DC battery. The power management system may further comprise an alternative power source coupled to the common DC bus and configured to provide AC or DC power. By using the DC battery as the secondary power source and/or the alternative power source in an elevator system, safety of the elevator system can be largely enhanced in an insecure situation like a power failure of the main power source. The alternative power source may comprise at least one of a solar panel, a fuel cell or a wind turbine.

According to a further embodiment, the power management system may further comprise a control module configured to control operations of the power management system. The control module may be coupled to each component of the power management system and an electric motor of the elevator system to control their operations over various modes including motoring mode, regenerative mode, and braking mode.

DRAWING DESCRIPTION

In the following exemplary embodiments of the invention are described with reference to the enclosed figures.

DETAILED DESCRIPTION

Figure 1:
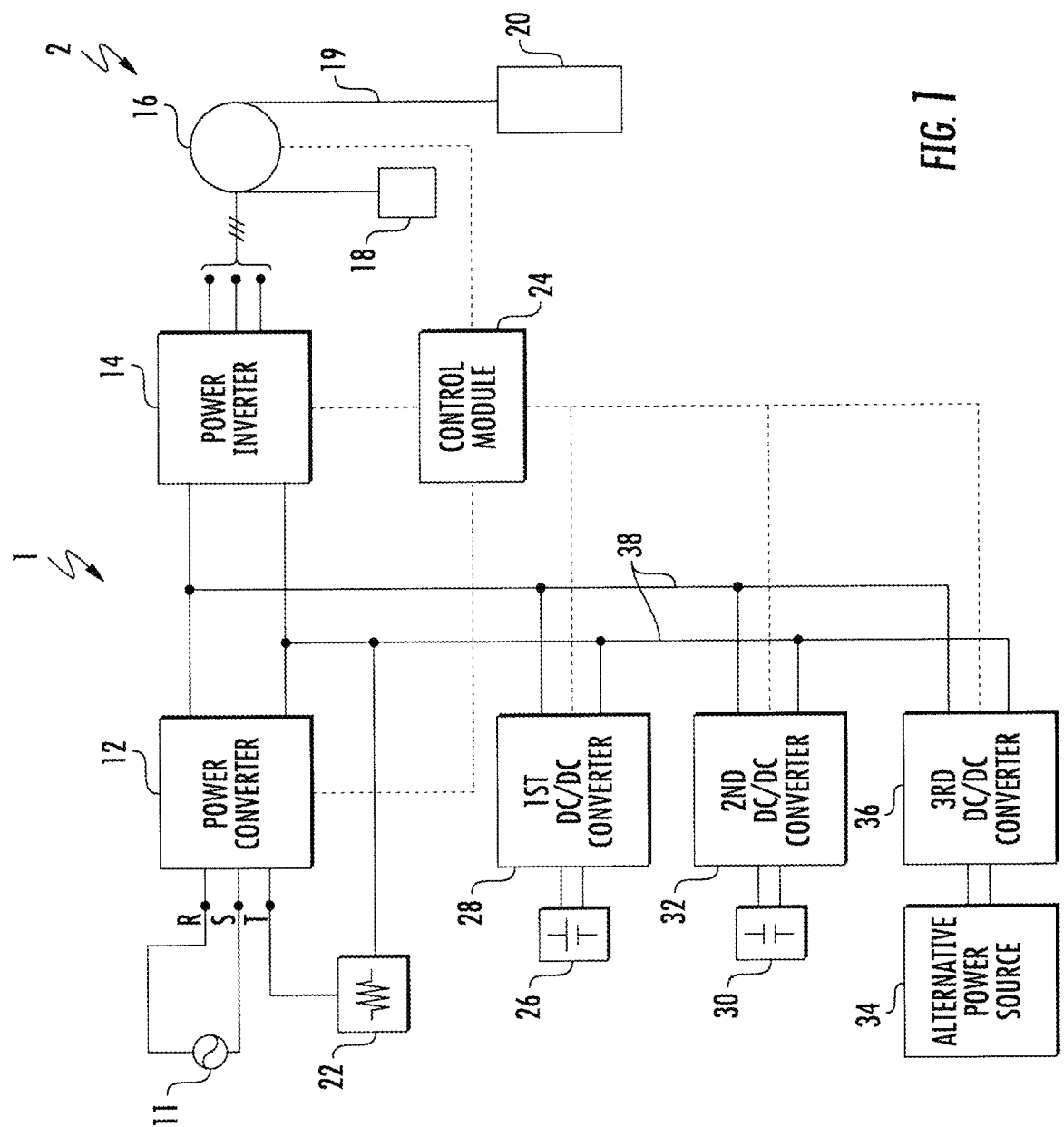
FIG. 1 is a block diagram of a power management system to be used in an elevator system according to an exemplary embodiment of the invention.

FIG. 1 is a block diagram of a power management system 1 to be used in an elevator system 2 according to an exemplary embodiment of the invention.

The power management system 1 shown in FIG. 1 comprises a main power source 11, a three-phase power converter 12, a power inverter 14, a dynamic braking resistor (DBR, 22), a control module 24, a DC power source 26, a first DC/DC converter 28, a supercapacitor stack 30, a second DC/DC converter 32, an alternative power source 34, a third DC/DC converter 36, and a common DC bus 38.

The elevator system 2 shown in FIG. 1 comprises an electric motor 16, a counterweight 18, a rope 19, and an elevator car 20. The electric motor 16 is provided with AC power from the power inverter 14 to drive the elevator car 20 and the counterweight 18 which are connected via the rope 19. The AC power supplied to the electric motor 16 may be a three-phase AC power provided by the power inverter 14, e.g. by pulse width modulation (PWM) from the DC power in the common DC bus 38.

The electric motor 16 is capable of operating in a motoring mode or in a regenerative mode. When the electric motor 16 operates in the motoring mode, the power management system 1 is configured to drive the electric motor 16 mainly based on the single-phase AC power supplied by the main power source 11. Yet, each of the DC power source 26, the supercapacitor stack 30, and the alternative power source 34 can also be a power source providing the electric motor 16 with the driving power. The DC power source 26 may comprise at least one secondary or rechargeable DC battery. The alternative power source 34 may comprise at least one of a solar panel, a fuel cell, a wind turbine, or other power generating devices.

When the electric motor 16 operates in the regenerative mode, regenerated electric power may be delivered to at least one of the main power source 11, the DC power source 26 or the supercapacitor stack 30.

The DC power source 26, the supercapacitor stack 30, and the alternative power source 34 may be coupled to the common DC bus 38 via the first DC/DC converter 28, the second DC/DC converter 32, and the third DC/DC converter 36, respectively. The first to third DC/DC converters 28, 32, 36 are optional and may provide for conversion of different voltage levels between each power source 26, 30, 34 and the common DC bus. In this way, the DC power source 26 and the alternative power source 34 can supply DC power to the common DC bus 38 as necessary.

The power inverter 14 may be a three-phase power inverter that is configured to invert the DC power from the common DC bus 38 to three-phase AC power to be delivered to the electric motor 16 to impart motion to the elevator car 20 in a motoring mode. In one example, this power conversion from DC power to three-phase AC power may be done by operating switches connected in three bridge circuits in the power inverter 14, e.g. such as to apply a pulse width power conversion scheme. The power inverter 14 can operate in a bidirectional way, so that in the regenerative mode AC power regenerated by the electric motor 16 is converted by the power inverter 14 to DC power to be delivered to the common DC bus 38.

The power inverter 14 comprises a plurality of power switches to generate drive signals for the electric motor 16. The power switches may be insulated gate bipolar transistors (IGBTs) or metal-oxide-semiconductor field-effect transistors (MOSFETs) transistors, but other types of power switches may be used as well. Each power switch normally includes a flyback diode across its drain-source terminals. The power switches are arranged in phase legs, each phase leg connected between the positive and negative poles of the common DC bus 38. An AC terminal is provided at a junction (e.g., source-drain junction) of the power switches in each phase leg. The AC terminal provides the output of the respective phase leg of the power inverter 14. The AC terminals are coupled to respective motor windings of the electric motor 16. In an exemplary embodiment, the electric motor 16 is a three-phase, permanent magnet synchronous motor. The power inverter 14 may be a three-phase inverter and the electric motor 16 may be a three-phase motor, but embodiments are not limited to a particular number of phases.

The power converter 12 is a three-phase bidirectional power converter which is configured to convert the AC power supplied by the main power source 11 to DC power. The three-phase power converter 12 may have a configuration corresponding to the configuration of the power inverter 14. Particularly, the three-phase power converter 12 may also comprise power switches arranged in phase legs, each phase leg connected between the positive and negative poles of the DC bus 38. Different to the power inverter 14, positive and negative poles of the DC bus 38 are coupled to the output of the phase legs of the three-phase power converter 12. A terminal provided at a junction (e.g., source-drain junction) of the power switches in each phase leg provides the input of the respective phase leg of the three-phase power converter 12. The three-phase power converter 12 may use power switches to convert DC power or AC power supplied to its input to a DC voltage supplied at its output. Power switches may also be IGBTs or MOSFETs, but other types of power switches may be used. Each power switch normally includes a flyback diode across its drain-source terminals. The three-phase power converter 12 uses actively controllable power switches, such as MOSFETs or other semiconductor switches. Thus, the three-phase power converter 12 is an actively controlled three-phase power converter 12 which is capable of regenerating power from the DC bus 38 to the input side of the three-phase power converter 12, if desired.

In FIG. 1, the main power source 11 is connected to the three-phase power converter 12 via two input terminals (first terminal R, second terminal S) among three input terminals (R, S, T) of the three-phase power converter 12. The main power source 11 may be a single-phase electrical power supplied from an electric power grid. The remaining input terminal (third terminal T) among the three input terminals (R, S, T) of the three-phase power converter 12 is connected to one terminal of the dynamic braking resistor 22, the other terminal of which is coupled to the common DC bus 38. In regenerative mode, if the current produced at the electric motor 16 is excessive, the control module 24 may cause current flow through the dynamic braking resistor 22 in order to dissipate excess energy. In other words, when current flows through the dynamic braking resistor 22 in regenerative mode, excess energy is dissipated through the dynamic braking resistor 22. A plurality of dynamic braking resistors 22 may be connected serially or in parallel.

The dynamic braking resistor 22 can be integrated into to the power management system 1 without any need to modify the internal configuration of the three-phase power converter 12. Particularly, there is no need to connect the dynamic braking resistor 22 to the common DC bus 38 directly or via a specifically dedicated power converter. Moreover, switching capabilities of the three-phase power converter 12 can be used for activating/deactivating the dynamic braking resistor 22. For example, where the three-phase power converter 12 is provided with phase legs made up with active switching elements, e.g. MOSFETs or other transistors, the switching elements of one of these phase legs can be used as dynamic braking switches for establishing or interrupting an electrical connection between the positive pole of the common DC bus 38 and a current path through the dynamic braking resistor 22 to the negative pole or ground of the common DC bus 38. It is thus unnecessary to provide a separate dynamic braking switch.

The control module 24 may be coupled to each component of the power management system 1 and the electric motor 16 to control their operations over various modes. During motoring mode, the control module 24 is configured to control power switches in the power inverter 14 to apply AC drive signals to the electric motor 16 to impart motion to the elevator car 20. During regenerative mode, the control module 24 is configured to control power switches included in the power inverter 14 to convert AC power from the electric motor 16 to DC power for charging at least one of the main power source 11, the DC power source 26, or the supercapacitor stack 30. The regenerative mode may occur when an empty or only lightly loaded elevator car 20 is traveling upwards or when a fully or strongly loaded elevator car 20 is traveling downwards.

In a braking mode, the control module 24 is configured to control the power switches in the power inverter 14 to control the speed of the elevator car 20. Braking mode may ensue upon opening of a safety chain in the elevator, or other event. A speed sensor (e.g., a rotary encoder) mounted at the electric motor 16 or any other rotatable part of the drive machine may provide a speed signal to the control module 24 indicative of the rotational speed of the electric motor 16 or drive machine. Such control module 24 may be implemented using a general-purpose microprocessor executing a computer program stored on a storage medium to perform the operations described herein. Alternatively, such control module 24 may be implemented in hardware (e.g., ASIC, FPGA) or in a combination of hardware/software. The control module 24 may also be part of an elevator control system.

During motoring mode, the control module 24 is configured to provide control signals to turn the power switches of the power inverter 14 alternately ON and OFF to generate an AC drive signal at each AC terminal of the power inverter 14. The AC drive signal may be a variable frequency signal. During regenerative mode, the control module 24 is configured to provide control signals to turn the power switches ON and OFF to convert AC power from the electric motor 16 to DC power on the common DC bus 38. Current sensors may be provided at each AC terminal of the power inverter 14 to allow the control module 24 to detect current at each AC terminal, in both motoring mode and regenerative mode.

Figure 2:
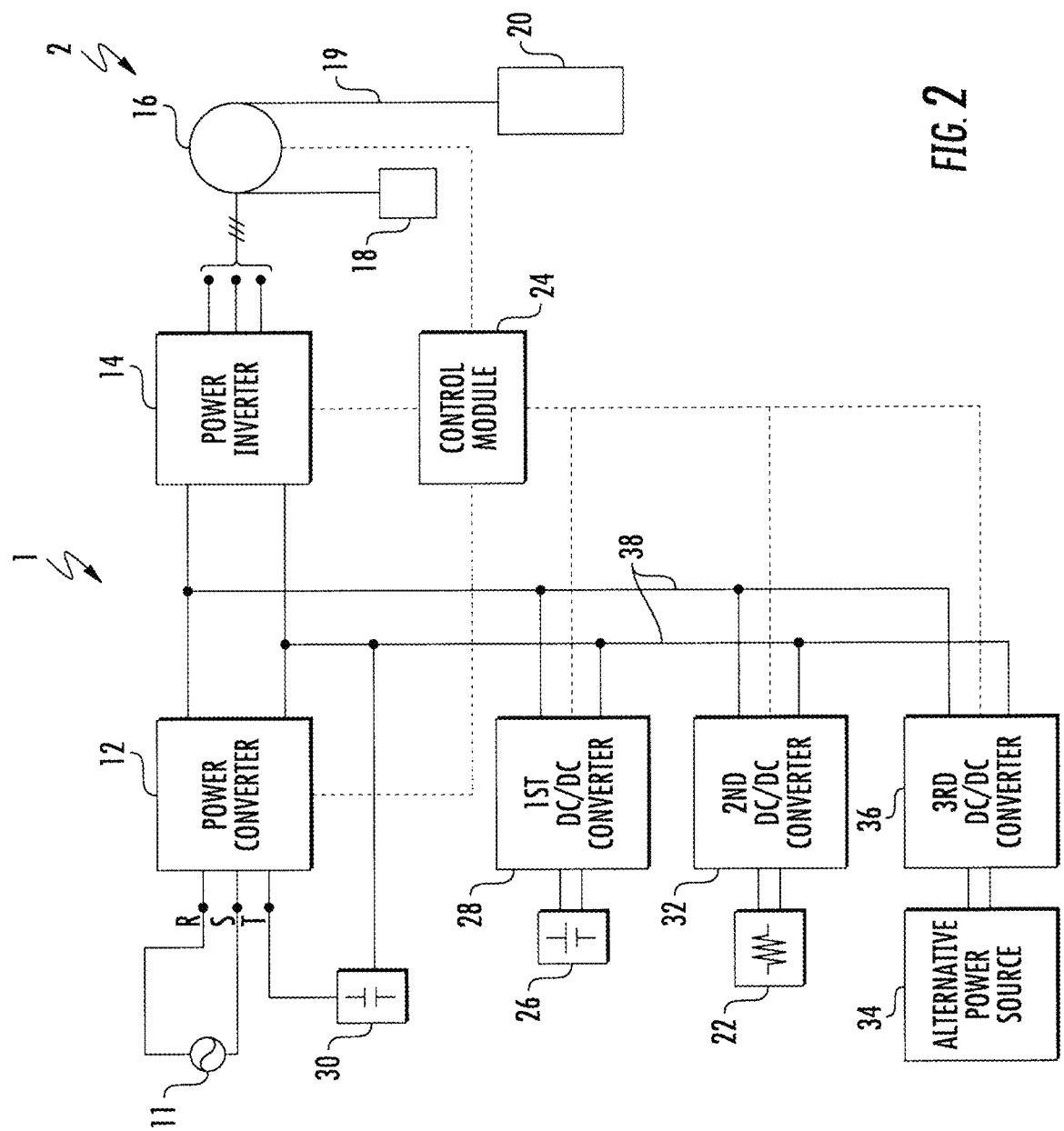
FIG. 2 is a block diagram of a power management system to be used in an elevator system according to another exemplary embodiment of the invention.

FIG. 2 is a block diagram of a power management system to be used in an elevator system according to another exemplary embodiment of the invention.

The configuration of the embodiment shown in FIG. 2 is similar to that of the embodiment depicted in FIG. 1 other than the arrangement of the dynamic braking resistor 22 and the supercapacitor stack 30. Particularly, in FIG. 2, the supercapacitor stack 30 is coupled between one input terminal (third terminal T) among the three input terminals (R, S, T) of the three-phase power converter 12 and the DC bus 38, and the dynamic braking resistor 22 is coupled to the DC bus 38 via the second DC/DC converter. The supercapacitor stack 30 may comprise a single supercapacitor or a plurality of supercapacitors coupled serially or in parallel.

During regenerative mode, regenerated electric power from the electric motor 16 can be stored in the supercapacitor stack 30. To do this, the control module 24 is configured to control power switches in the power inverter 14 to convert AC power from the electric motor 16 to DC power to be stored into the supercapacitor stack 30 via power switches of the three-phase power converter 12. The regenerative mode may occur when an empty or slightly loaded elevator car 20 is traveling upwards or when a fully or strongly loaded elevator car 20 is traveling downwards.

During motoring mode, electric power stored in the supercapacitor stack 30 may be supplied through the three-phase power converter 12 and the power inverter 14 under the control of the control module 24 to drive the electric motor 16.

Figure 3:
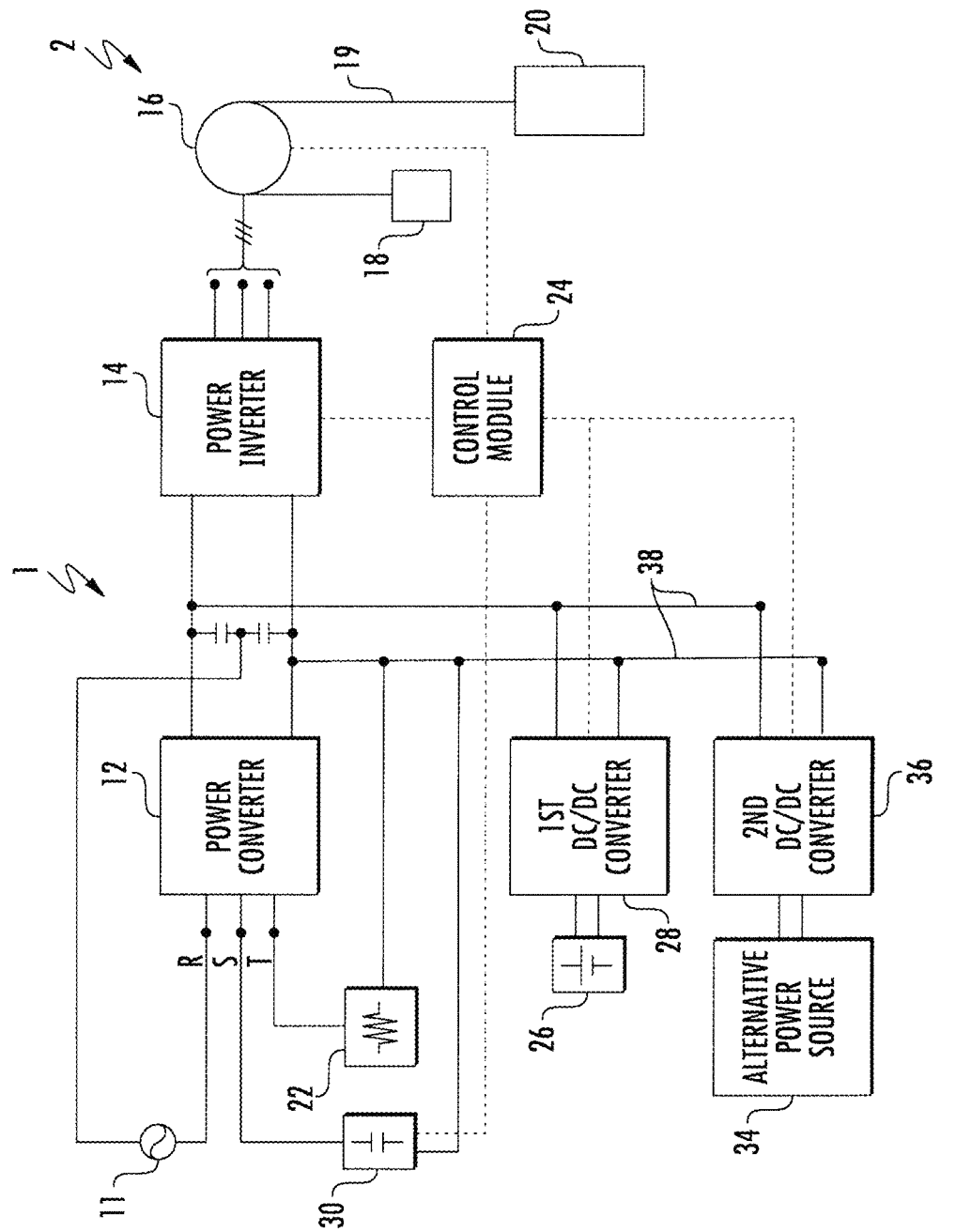
FIG. 3 is a block diagram of a power management system to be used in an elevator system according to yet another exemplary embodiment of the invention.

FIG. 3 is a block diagram of a power management system to be used in an elevator system according to yet another exemplary embodiment of the invention.

The power management system 1 shown in FIG. 3 employs a half bridge configuration for the three-phase power converter 12 that allows leveraging two of the input terminals (phase-legs) of the three-phase power converter 12 to further reduce the amount of extra power conversion stages. In other words, the main power source 11 supplying the single-phase AC power to the power management system 1 is coupled between one input terminal (first terminal R) among the three input terminals (R, S, T) of the three-phase power converter 12 and an intermediate circuit coupled in between the positive and negative poles of the DC bus 38. Two remaining input terminals (second terminal S, third terminal T) of the three-phase power converter 12 are coupled to the dynamic braking resistor 22 and the supercapacitor stack 30, respectively.

The control module 24 is configured to control the three-phase power converter 12, the power inverter 14, and the electric motor 16 during various modes like motoring mode, regenerative mode, or braking mode in order to make electric power flow between the dynamic braking resistor 22, the supercapacitor stack 30, and the electric motor 16 etc.

According to the embodiments of the present invention, an existing power management system using a three-phase power converter (and thus configured to be supplied by a three-phase AC power source) can be supplied by a single-phase AC power source without causing additional cost and complexity. In addition, a dynamic braking resistor and/or a supercapacitor stack can be easily coupled to the power management system using power switches included in the existing three-phase power converter. Further, a secondary power source like a DC battery and/or an alternative power source like a solar panel, a fuel cell or a wind turbine etc. can be easily integrated into or connected to the existing power management system by coupling them to the common DC bus via a DC/DC converter or an AC/DC converter.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 power management system
2 elevator system
11 main power source
12 three-phase power converter
14 power inverter
16 electric motor
18 counterweight
19 roping
20 elevator car
22 dynamic braking resistor
24 control module
26 secondary power source
28 1st DC/DC converter
30 supercapacitor stack
32 2nd DC/DC converter
34 alternative power source
36 3rd DC/DC converter
38 DC bus

What is claimed is:

1. A power management system (1) for an elevator system (2), the power management system (1) comprising:
a three-phase power converter (12) having three input terminals (R, S, T) and two output terminals, a first (R) and a second (S) of the input terminals coupled to a main power source (11) for supplying single-phase AC power to the power management system (1) and the three-phase power converter (12) configured to convert the AC power from the main power source (11) into DC power on a common DC bus (38) connected to the two output terminals;
a secondary power source (26) for supplying DC power to the common DC bus (38);
a power inverter (14) configured to invert the DC power on the common DC bus (38) into AC output power for driving an electric motor (16) of the elevator system (2); and
a dynamic braking resistor (22) having a first terminal directly connected to a third input terminal (T) among the three input terminals (R, S, T) of the three-phase power converter (12) and having a second terminal directly connected to the DC bus (38).

2. The power management system according to claim 1, further comprising a supercapacitor stack (30) which is coupled to the common DC bus (38).

3. The power management system according to claim 1, wherein the secondary power source (26) is a DC battery.

4. The power management system according to claim 1, further comprising an alternative power source (34) which is coupled to the common DC bus (38) and configured to provide AC or DC power.

5. The power management system according to claim 1, further comprising a control module (24) configured to control operations of the power management system (1).

6. The power management system according to claim 4, wherein the alternative power source (34) comprises at least one of a solar panel, a fuel cell or a wind turbine.

7. The power management system according to claim 2, wherein the supercapacitor stack (30) comprises a single supercapacitor or a plurality of supercapacitors connected serially or in parallel.

8. A power management system (1) for an elevator system (2), the power management system (1) comprising:
a three-phase power converter (12) having three input terminals (R, S, T) and two output terminals, a first input terminal (R) of the three input terminals being coupled to a main power source (11) for supplying single-phase AC power to the power management system (1), the main power source being coupled between the first input terminal and an intermediate circuit connected intermediate the positive and negative poles of a common DC bus; the three-phase power converter (12) is configured to convert the AC power from the main power source (11) into DC power on the common DC bus (38) connected to the two output terminals;
a secondary power source (26) for supplying DC power to the common DC bus (38);
a power inverter (14) configured to invert the DC power on the common DC bus (38) into AC output power for driving an electric motor (16) of the elevator system (2);
a dynamic braking resistor (22) having a first terminal directly connected to a third input terminal (T) among the three input terminals of the three-phase power converter (12) and having a second terminal directly connected to the common DC bus (38); and
a supercapacitor stack (30) coupled between a second input terminal(S) among the three input terminals of the three-phase power converter (12) and the common DC bus (38).

9. The power management system of claim 8, wherein the secondary power source (26) is a DC battery.

10. The power management system of claim 8, further comprising an alternative power source (34), the alternative power source (34) coupled to the common DC bus (38) and configured to provide AC or DC power.

11. The power management system of claim 10, wherein the alternative power source (34) comprises at least one of a solar panel, a fuel cell, or a wind turbine.

12. The power management system of claim 8, further comprising a control module (24), the control module (24) configured to control operation of the power management system (1).

13. The power management system of claim 8, wherein the supercapacitor stack (30) comprises a single supercapacitor or a plurality of supercapacitors connected in series or parallel.

\* \* \* \* \*